US010372673B2

(12) United States Patent
Guo et al.

(10) Patent No.: US 10,372,673 B2
(45) Date of Patent: Aug. 6, 2019

(54) STORAGE NETWORK ELEMENT DISCOVERY METHOD AND APPARATUS

(71) Applicant: Huawei Technologies Co., Ltd., Shenzhen (CN)

(72) Inventors: Haitao Guo, Hangzhou (CN); Yu Zhang, Shenzhen (CN); Yajun Chen, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 154 days.

(21) Appl. No.: 15/599,005

(22) Filed: May 18, 2017

(65) Prior Publication Data

US 2017/0316018 A1    Nov. 2, 2017

Related U.S. Application Data

(63) Continuation of application No. PCT/CN2016/080631, filed on Apr. 29, 2016.

(51) Int. Cl.
*G06F 16/13*        (2019.01)
*H04L 12/26*        (2006.01)
(Continued)

(52) U.S. Cl.
CPC ............. *G06F 16/13* (2019.01); *H04L 41/12* (2013.01); *H04L 43/0805* (2013.01);
(Continued)

(58) Field of Classification Search
CPC ... G06F 17/30091; G06F 16/13; H04L 43/10; H04L 41/12; H04L 43/0811; H04L 67/16;
(Continued)

(56) References Cited

U.S. PATENT DOCUMENTS

2006/0236017 A1* 10/2006 Rooholamini ........ H04L 49/552
710/316
2006/0277347 A1* 12/2006 Ashmore .............. G06F 3/0611
710/313
(Continued)

FOREIGN PATENT DOCUMENTS

CN         101056254 A       10/2007
CN         101969465 A        2/2011
(Continued)

OTHER PUBLICATIONS

Machine Translation and Abstract of Chinese Publication No. CN101056254, Oct. 17, 2007, 28 pages.
(Continued)

*Primary Examiner* — Will W Lin
(74) *Attorney, Agent, or Firm* — Conley Rose, P.C.

(57) ABSTRACT

A storage network element discovery method and an apparatus, where the method includes broadcasting or multicasting, by a control network element, a heartbeat message to at least one storage network element, where the heartbeat message includes address information of the control network element, receiving, by the control network element, a response message returned by at least one storage network element according to the heartbeat message, and determining an accessible storage network element according to the response message, where the response message includes network parameter information of the corresponding storage network element. Therefore, in a storage array, by broadcasting or multicasting a heartbeat message and according to a reply from a storage network element, a control network element may determine a storage network element that can be accessed by the control network element.

14 Claims, 9 Drawing Sheets

(51) Int. Cl.
*H04L 29/08* (2006.01)
*H04L 29/06* (2006.01)
*H04L 12/24* (2006.01)

(52) U.S. Cl.
CPC .......... *H04L 43/0811* (2013.01); *H04L 43/10* (2013.01); *H04L 65/4076* (2013.01); *H04L 67/1097* (2013.01); *H04L 67/16* (2013.01); H04L 29/06176 (2013.01); H04L 63/10 (2013.01); H04L 67/06 (2013.01)

(58) Field of Classification Search
CPC ............. H04L 65/4076; H04L 43/0805; H04L 67/1097; H04L 29/06176; H04L 63/10; H04L 67/06
See application file for complete search history.

(56) References Cited

U.S. PATENT DOCUMENTS

| | | | | |
|---|---|---|---|---|
| 2012/0166699 | A1* | 6/2012 | Kumar | G06F 13/385 710/306 |
| 2013/0086336 | A1* | 4/2013 | Canepa | G06F 3/0683 711/154 |
| 2013/0124607 | A1* | 5/2013 | Griffith | H04L 43/10 709/203 |
| 2013/0282953 | A1* | 10/2013 | Orme | G06F 12/0238 711/102 |
| 2014/0025770 | A1* | 1/2014 | Warfield | G06F 15/17331 709/213 |
| 2015/0058491 | A1 | 2/2015 | Miyama et al. | |
| 2015/0244804 | A1* | 8/2015 | Warfield | H04L 47/6295 709/219 |
| 2016/0085718 | A1* | 3/2016 | Huang | H04L 29/08 709/213 |
| 2016/0127468 | A1* | 5/2016 | Malwankar | G06F 9/45558 709/212 |
| 2016/0127492 | A1* | 5/2016 | Malwankar | H04L 67/2842 709/212 |
| 2016/0203053 | A1* | 7/2016 | Talagala | H04L 67/1097 714/6.12 |
| 2017/0019475 | A1* | 1/2017 | Metz | H04L 67/1012 |
| 2017/0192889 | A1* | 7/2017 | Sato | G06F 12/0811 |
| 2017/0235609 | A1* | 8/2017 | Wires | G06F 9/5016 718/104 |

FOREIGN PATENT DOCUMENTS

| | | |
|---|---|---|
| CN | 101989999 A | 3/2011 |
| CN | 102143215 A | 8/2011 |
| CN | 104111907 A | 10/2014 |
| CN | 105227672 A | 1/2016 |
| CN | 105260330 A | 1/2016 |
| EP | 3147792 A1 | 3/2017 |
| JP | 2015041947 A | 3/2015 |

OTHER PUBLICATIONS

Machine Translation and Abstract of Chinese Publication No. CN101969465, Feb. 9, 2011, 22 pages.
Machine Translation and Abstract of Chinese Publication No. CN101989999, Mar. 23, 2011, 8 pages.
Machine Translation and Abstract of Chinese Publication No. CN105227672, Jan. 6, 2016, 15 pages.
Foreign Communication From a Counterpart Application, PCT Application No. PCT/CN2016/080631, International Search Report dated Jan. 26, 2017, 4 pages.
Machine Translation and Abstract of Chinese Publication No. CN102143215, Aug. 3, 2011, 27 pages.
Machine Translation and Abstract of Chinese Publication No. CN105260330, Jan. 20, 2016, 46 pages.
Foreign Communication From a Counterpart Application, European Application No. 16856467.2, Extended European Search Report dated Feb. 20, 2018, 9 pages.

* cited by examiner

Table 3

| | Byte 3 | | | | | | | Byte 2 | Byte 1 | | | | | | | | | Byte 0 | | | | | | | |
|---|---|---|---|---|---|---|---|---|---|---|---|---|---|---|---|---|---|---|---|---|---|---|---|---|---|
| | | | | | | | | | 15 | 14 | 13 | 12 | 11 | 10 | 9 | 8 | 7 | 6 | 5 | 4 | 3 | 2 | 1 | 0 |
| 0 | V=1 | Reserved | BC=2 | | | | | Reserved | | | | | | | | | OPC=0x060 | | | | | | | | |
| 1 | HTAG=0 | | | | | | | | | | | | | | | | | | | | | | | |
| 2 | MAC address of a storage network element | | | | | | | | | | | | | | | Tag | | | | | | | | |
| 3 | MAC address of a storage network element | | | | | | | | | | | | | | | | | | | | | | | |
| 4 | | | | | | | | Link rate | Address family | | | | | | | | | | | | | | | |
| 5 | Transmission address | | | | | | | | | | | | | | | | | | | | | | | |
| 6 | | | | | | | | | | | | | | | | | | | | | | | | |
| 7 | | | | | | | | | | | | | | | | | | | | | | | | |
| 8 | | | | | | | | | | | | | | | | | | | | | | | | |
| 9 | Address of a first storage medium | | | | | | | | | | | | | | | | | | | | | | | |
| 10 | | | | | | | | | | | | | | | | | | | | | | | | |
| 11 | Address of a second storage medium | | | | | | | | | | | | | | | | | | | | | | | |
| 12 | | | | | | | | | | | | | | | | | | | | | | | | |
| 13 | | | | | | | | | | | | | | | | | | | | | | | | |
| ...... | | | | | | | | | | | | | | | | | | | | | | | | |
| 31 | | | | | | | | | | | | | | | | | | | | | | | | |

FIG. 16

STORAGE NETWORK ELEMENT DISCOVERY METHOD AND APPARATUS

CROSS-REFERENCE TO RELATED APPLICATION

This application is a continuation of International Patent Application No. PCT/CN2016/080631 filed on Apr. 29, 2016, which is hereby incorporated by reference in its entirety.

TECHNICAL FIELD

The present disclosure relates to network technologies, and in particular, to a storage network element discovery method and an apparatus.

BACKGROUND

During conventional use of Nonvolatile Memory express (NVMe), an NVMe storage device is tightly coupled to a control network element using a Peripheral Component Interconnect Express (PCIe) bus. A device connected to the PCIe bus may be directly discovered by a system when the system is powered on, and may be used immediately after being initialized.

In some other approaches, after an NVMe over fabric (NOF) technology emerges, use of the NVMe is extended from a system to a network. As a result, an initialized control network element cannot accurately sense an accessible NVMe storage device.

SUMMARY

Embodiments of the present disclosure provide a storage network element discovery method and an apparatus in order to resolve a problem in NOF technology that an initialized control network element cannot accurately sense an accessible NVMe storage device.

A first aspect of the embodiments of the present disclosure provides a storage network element discovery method, where the method is applied to a storage array, the storage array includes at least one control network element and at least one storage network element, each storage network element includes at least one storage medium, the storage network element is connected to the storage medium using a NVMe interface, and the method includes broadcasting or multicasting, by the control network element, a heartbeat message to at least one storage network element, where the heartbeat message includes address information of the control network element, receiving, by the control network element, a response message returned by at least one storage network element according to the heartbeat message, and determining, according to the response message, that the at least one storage network element is an accessible storage network element, where the response message includes network parameter information of the corresponding storage network element, where the network parameter information includes network address information of the storage network element and address information of the storage medium, where the address information of the storage medium is obtained by the storage network element using the NVMe interface between the storage network element and the storage medium. The address information of the storage medium may be address information of at least one storage medium in the storage network element that returns the response message.

Optionally, the network parameter information may further include type information of the storage network element, a namespace of the storage medium, or the like.

Optionally, broadcasting or multicasting, by the control network element, a heartbeat message to at least one storage network element includes periodically broadcasting or multicasting, by the control network element, the heartbeat message to the at least one storage network element, and after receiving, by the control network element, a response message returned by at least one storage network element according to the heartbeat message, the method further includes periodically receiving, by the control network element, a response message returned by the at least one storage network element.

Further, after receiving, by the control network element, a response message returned by at least one storage network element according to the heartbeat message, the method further includes determining, by the control network element, that a link to the first accessible storage network element is disconnected if the control network element does not receive, within a preset period of time, a response message returned by a first accessible storage network element, where the first accessible storage network element is any storage network element in the at least one storage network element.

The control network element considers that the link to the first accessible storage network element is disconnected. Usually, the link may be broken, a hot swap may occur, or the like.

Optionally, if the network parameter information returned by a first accessible storage network element includes link status information, after receiving, by the control network element, a response message returned by at least one storage network element according to the heartbeat message, the method further includes determining, by the control network element, a link status of the first accessible storage network element according to the link status information, where the first accessible storage network element is any storage network element in the at least one storage network element.

The link status information indicates that a link status changes, and the control network element may learn, according to the link status information, that the link status changes. In this case, the control network element usually considers that a link or links to one or more storage media in the storage network element is or are disconnected.

Based on the foregoing description, determining, by the control network element, a link status of the first accessible storage network element according to the link status information includes determining, by the control network element according to the link status information, that a link to a storage medium in the first accessible storage network element is disconnected, and after determining, by the control network element according to the link status information, that a link to a storage medium in the first accessible storage network element is disconnected, the method further includes sending, by the control network element, a link repair processing request to the first accessible storage network element.

Optionally, after determining, by the control network element according to the response message, that the at least one storage network element is an accessible storage network element, the method further includes sending, by the control network element, a data read request to the accessible storage network element using a switching device, where the data read request includes storage-network-element address information and to-be-read-data location information, and receiving, by the control network element, to-be-read data returned by the accessible storage network element according to the data read request.

Optionally, after determining, by the control network element according to the response message, that the at least one storage network element is an accessible storage network element, the method further includes sending, by the control network element, a data write request to the accessible storage network element using a switching device, where the data write request includes to-be-written data, storage-network-element address information, and to-be-written-data location information, and receiving, by the control network element, a write success response returned by the accessible storage network element according to the data write request.

A second aspect of the embodiments of the present disclosure provides a storage network element discovery method, where the method is applied to a storage array, the storage array includes at least one control network element and at least one storage network element, each storage network element includes at least one storage medium, the storage network element is connected to the storage medium using a NVMe interface, and the method includes receiving, by the storage network element, a heartbeat message broadcast or multicast by the control network element, where the heartbeat message includes address information of the control network element, and returning, by the storage network element, a response message to the control network element according to the heartbeat message such that the control network element determines that the storage network element is an accessible storage network element, where the response message includes network parameter information of the storage network element, where the network parameter information includes a network address of the storage network element, and address information of the storage medium in the storage network element obtained by the storage network element using the NVMe interface.

Optionally, receiving, by the storage network element, a heartbeat message broadcast or multicast by the control network element includes receiving, by the storage network element, the heartbeat message periodically broadcast or multicast by the control network element, and returning, by the storage network element, a response message to the control network element according to the heartbeat message includes periodically returning, by the storage network element, a response message to the control network element according to the heartbeat message.

Returning, by the storage network element, a response message to the control network element according to the heartbeat message includes returning, by the storage network element to the control network element according to the heartbeat message, a response message that carries link status information such that the control network element determines a link status of the storage network element according to the link status information.

Further, if the link status information indicates that a link to a storage medium in the storage network element is disconnected, after returning, by the storage network element, a response message to the control network element according to the heartbeat message, the method further includes receiving, by the storage network element, a link repair processing request sent by the control network element, and performing, by the storage network element, link repair according to the link repair processing request.

Optionally, after returning, by the storage network element, a response message to the control network element according to the heartbeat message, the method further includes receiving, by the storage network element, a data read request sent by the control network element using a switching device, where the data read request includes storage-network-element address information and to-be-read-data location information, obtaining, by the storage network element, to-be-read data according to the data read request, and returning, by the storage network element, the to-be-read data to the control network element using the switching device.

Optionally, after returning, by the storage network element, a response message to the control network element according to the heartbeat message, the method further includes receiving, by the storage network element, a data write request sent by the control network element using a switching device, where the data write request includes to-be-written data, storage-network-element address information, and to-be-written-data location information, and writing, by the storage network element, the to-be-written data according to the data write request, and returning a write success response to the control network element.

A third aspect of the embodiments of the present disclosure provides a control network element, where the control network element is applied to a storage array, the storage array includes at least one control network element and at least one storage network element, each storage network element includes at least one storage medium, the storage network element is connected to the storage medium using a NVMe interface, and the control network element includes a sending module configured to broadcast or multicast a heartbeat message to at least one storage network element, where the heartbeat message includes address information of the control network element, a receiving module configured to receive a response message returned by at least one storage network element according to the heartbeat message, and a discovery module configured to determine, according to the response message, that the at least one storage network element is an accessible storage network element, where the response message includes network parameter information of the corresponding storage network element, where the network parameter information includes network address information of the storage network element and address information of the storage medium, where the address information of the storage medium is obtained by the storage network element using the NVMe interface between the storage network element and the storage medium.

Optionally, the sending module is further configured to periodically broadcast or multicast the heartbeat message to the at least one storage network element, and the receiving module is further configured to periodically receive a response message returned by the at least one storage network element.

The control network element further includes a first determining module configured to determine that a link to the first accessible storage network element is disconnected when the receiving module does not receive, within a preset period of time, a response message returned by a first accessible storage network element, where the first accessible storage network element is any storage network element in the at least one storage network element.

Optionally, if the network parameter information returned by a first accessible storage network element includes link status information, the control network element further includes a second determining module configured to determine a link status of the first accessible storage network element according to the link status information, where the first accessible storage network element is any storage network element in the at least one storage network element.

The second determining module is further configured to determine, according to the link status information, that a link to a storage medium in the first accessible storage network element is disconnected, and the control network element further includes a repair module configured to send a link repair processing request to the first accessible storage network element.

Optionally, the sending module is further configured to send a data read request to the accessible storage network element using a switching device, where the data read request includes storage-network-element address information and to-be-read-data location information, and the receiving module is further configured to receive to-be-read data returned by the accessible storage network element according to the data read request.

Optionally, the sending module is further configured to send a data write request to the accessible storage network element using a switching device, where the data write request includes to-be-written data, storage-network-element address information, and to-be-written-data location information, and the receiving module is further configured to receive a write success response returned by the accessible storage network element according to the data write request.

A fourth aspect of the embodiments of the present disclosure provides a storage network element, where the storage network element is applied to a storage array, the storage array includes at least one control network element and at least one storage network element, each storage network element includes at least one storage medium, the storage network element is connected to the storage medium using a NVMe interface, and the storage network element includes a receiving module configured to receive a heartbeat message broadcast or multicast by the control network element, where the heartbeat message includes address information of the control network element, and a sending module configured to return a response message to the control network element according to the heartbeat message such that the control network element determines that the storage network element is an accessible storage network element, where the response message includes network parameter information of the storage network element, where the network parameter information includes a network address of the storage network element, and address information of the storage medium in the storage network element obtained by the storage network element using the NVMe interface.

Optionally, the receiving module is further configured to receive the heartbeat message periodically broadcast or multicast by the control network element, and the sending module is further configured to periodically return a response message to the control network element according to the heartbeat message.

Optionally, the sending module is further configured to return, to the control network element according to the heartbeat message, a response message that carries link status information such that the control network element determines a link status of the storage network element according to the link status information.

Further, the storage network element further includes a repair processing module, where the receiving module is further configured to receive a link repair processing request sent by the control network element, and the repair processing module is configured to perform link repair according to the link repair processing request.

Optionally, the storage network element further includes an obtaining module, where the receiving module is further configured to receive a data read request sent by the control network element using a switching device, where the data read request includes storage-network-element address information and to-be-read-data location information, the obtaining module is configured to obtain to-be-read data according to the data read request, and the sending module is further configured to return the to-be-read data to the control network element using the switching device.

Optionally, the storage network element further includes a write module, where the receiving module is further configured to receive a data write request sent by the control network element using a switching device, where the data write request includes to-be-written data, storage-network-element address information, and to-be-written-data location information. The write module is configured to write the to-be-written data according to the data write request, and the sending module is further configured to return a write success response to the control network element.

A fifth aspect of the embodiments of the present disclosure provides a control network element. The control network element is applied to a storage array. The storage array includes at least one control network element and at least one storage network element, each storage network element includes at least one storage medium, and the storage network element is connected to the storage medium using a NVMe interface. The control network element includes a processor, a transmitter, a receiver, and a memory. The processor, the transmitter, the receiver, and the memory are connected using a bus. In actual application, the memory, the transmitter, the receiver, and the processor may not be in a bus structure, and may be in another structure, for example, a star structure. This is not limited in the embodiments of the present disclosure.

The memory is configured to store an instruction. The processor is configured to invoke the instruction in the memory to execute the following method.

The processor broadcasts or multicasts a heartbeat message to at least one storage network element using the transmitter, where the heartbeat message includes address information of the control network element.

The processor receives, using the receiver, a response message returned by at least one storage network element according to the heartbeat message, and determines, according to the response message, that the at least one storage network element is an accessible storage network element. The response message includes network parameter information of the corresponding storage network element.

The network parameter information includes network address information of the storage network element and address information of the storage medium. The address information of the storage medium is obtained by the storage network element using the NVMe interface between the storage network element and the storage medium.

Optionally, the processor is further configured to periodically broadcast or multicast the heartbeat message to the at least one storage network element using the transmitter, and periodically receive, using the receiver, a response message returned by the at least one storage network element.

Optionally, if no response message returned by a first accessible storage network element is received within a preset period of time, the processor determines that a link to the first accessible storage network element is disconnected, where the first accessible storage network element is any storage network element in the at least one storage network element.

Optionally, if the network parameter information returned by a first accessible storage network element includes link status information, after receiving, using the receiver, the response message returned by the at least one storage network element according to the heartbeat message, the processor determines a link status of the first accessible storage network element according to the link status information.

The first accessible storage network element is any storage network element in the at least one storage network element.

Further, the processor is further configured to determine, according to the link status information, that a link to a storage medium in the first accessible storage network element is disconnected, and after determining that the link to the storage medium in the first accessible storage network element is disconnected, the processor sends a link repair processing request to the first accessible storage network element using the transmitter.

Optionally, after the processor determines, according to the response message, that the at least one storage network element is an accessible storage network element, the transmitter sends a data read request to the accessible storage network element using a switching device. The data read request includes storage-network-element address information and to-be-read-data location information. The processor receives, using the receiver, to-be-read data returned by the accessible storage network element according to the data read request.

Optionally, after the processor determines, according to the response message, that the at least one storage network element is an accessible storage network element, the processor uses the transmitter, and the transmitter sends a data write request to the accessible storage network element using a switching device. The data write request includes to-be-written data, storage-network-element address information, and to-be-written-data location information. The receiver receives a write success response returned by the accessible storage network element according to the data write request.

A sixth aspect of the embodiments of the present disclosure provides a storage network element. The storage network element is applied to a storage array. The storage array includes at least one control network element and at least one storage network element, each storage network element includes at least one storage medium, and the storage network element is connected to the storage medium using a NVMe interface. The storage network element includes a processor, a transmitter, a receiver, and a memory. The processor, the transmitter, the receiver, and the memory are connected using a bus. In actual application, the memory, the transmitter, the receiver, and the processor may not be in a bus structure, and may be in another structure, for example, a star structure. This is not limited in the embodiments of the present disclosure.

The memory is configured to store an instruction. The processor is configured to invoke the instruction in the memory to execute the following method.

The processor receives, using the receiver, a heartbeat message broadcast or multicast by the control network element. The heartbeat message includes address information of the control network element. The processor returns a response message to the control network element using the transmitter such that the control network element determines that the storage network element is an accessible storage network element. The response message includes network parameter information of the storage network element.

The network parameter information includes a network address of the storage network element, and address information of the storage medium in the storage network element obtained by the storage network element using the NVMe interface.

Optionally, the processor receives, using the receiver, the heartbeat message periodically broadcast or multicast by the control network element, and periodically returns a response message to the control network element according to the heartbeat message using the transmitter.

That the processor returns a response message to the control network element according to the heartbeat message using the transmitter includes that the processor returns, to the control network element according to the heartbeat message using the transmitter, a response message that carries link status information such that the control network element determines a link status of the storage network element according to the link status information.

Further, if the link status information indicates that a link to a storage medium in the storage network element is disconnected, the processor receives, using the receiver, a link repair processing request sent by the control network element, and performs link repair according to the link repair processing request.

Optionally, the processor receives, using the receiver, a data read request sent by the control network element using a switching device. The data read request includes storage-network-element address information and to-be-read-data location information. Further, the processor obtains to-be-read data according to the data read request. The processor uses the transmitter, and the transmitter returns the to-be-read data to the control network element using the switching device.

Optionally, the processor receives, using the receiver, a data write request sent by the control network element using a switching device. The data write request includes to-be-written data, storage-network-element address information, and to-be-written-data location information. Further, the processor writes the to-be-written data according to the data write request. The transmitter returns a write success response to the control network element using the switching device.

According to the storage network element discovery method and the apparatus that are provided in the embodiments of the present disclosure, a control network element broadcasts or multicasts a heartbeat message to at least one storage network element, receives a response message returned by at least one storage network element according to the heartbeat message, and further determines, according to the response message, that the at least one storage network element is an accessible storage network element. In a NOF storage array, by broadcasting or multicasting a heartbeat message and according to a reply from a storage network element, a control network element may determine a storage network element that can be accessed by the control network element, and know related information of the accessible storage network element according to network parameter information returned by the accessible storage network element.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show some embodiments of the pres

FIG. 16 is an illustration of a payload field of a heartbeat packet according to the present disclosure.

DESCRIPTION OF EMBODIMENTS

Embodiments of the present disclosure may be applied to a storage array. The storage array may usually include at least one storage network element and at least one control network element. The control network element may be a storage controller. Various types of storage software or application programs may run on the control network element, for example, a NOF software program may run on the control network element. Each storage network element may include at least one storage medium. For example, each storage network element may support a storage medium with a serial attached small computer system interface (SAS), a storage medium with an NVMe interface, and may also support a storage medium such as a hard disk drive (HDD) or a solid state drive (SSD). This is not limited herein.

The storage network element and the control network element may be connected using a high-speed network such as a fibre channel (FC), INFINIBAND, Ethernet, or PCIe. This is not limited herein.

Figure 1:
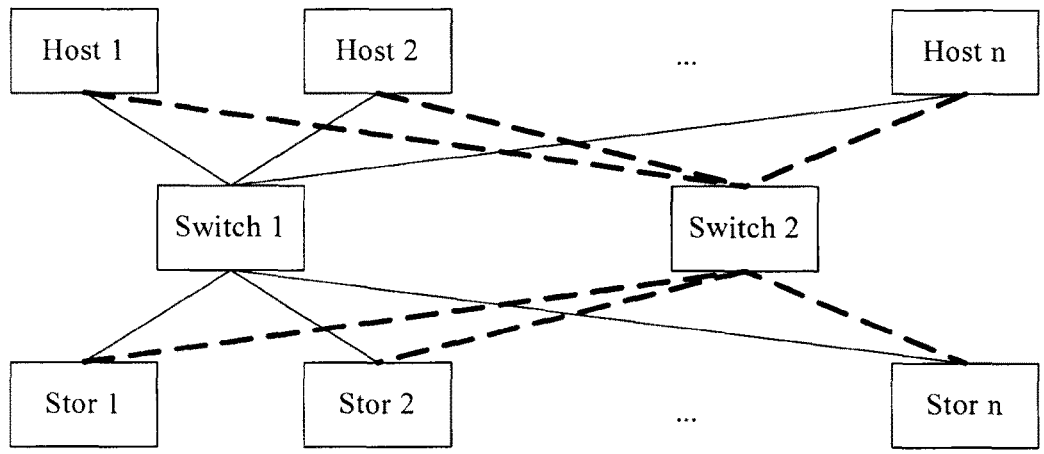
- FIG. 1 is a schematic diagram of an application scenario of a storage network element discovery method according to the present disclosure.

FIG. 1 is a schematic diagram of an application scenario of a storage network element discovery method according to the present disclosure. FIG. 1 shows a relatively typical topology of a storage array. The storage array includes n storage network elements (designated as Stor 1, Stor 2, ..., and Stor n) and n control network elements (designated as Host 1, Host 2, ..., Host n). In consideration of reliability, two mutually redundant switching planes (a straight-line connected switching plane and a dotted-line connected switching plane in FIG. 1) are deployed in the storage array in FIG. 1. That is, the storage network elements and the control network elements are connected using each of a switch 1 and a switch 2.

In the storage array, the control network elements and the storage network elements are located in an equal network, and therefore there is no definite affiliation relationship between the control network elements and the storage network elements. According to the method provided in the present disclosure, a control network element may learn related information of an accessible storage network element after being powered on in order to facilitate subsequent control over the storage network element by the control network element and interaction between the control network element and the storage network element.

Figure 2:
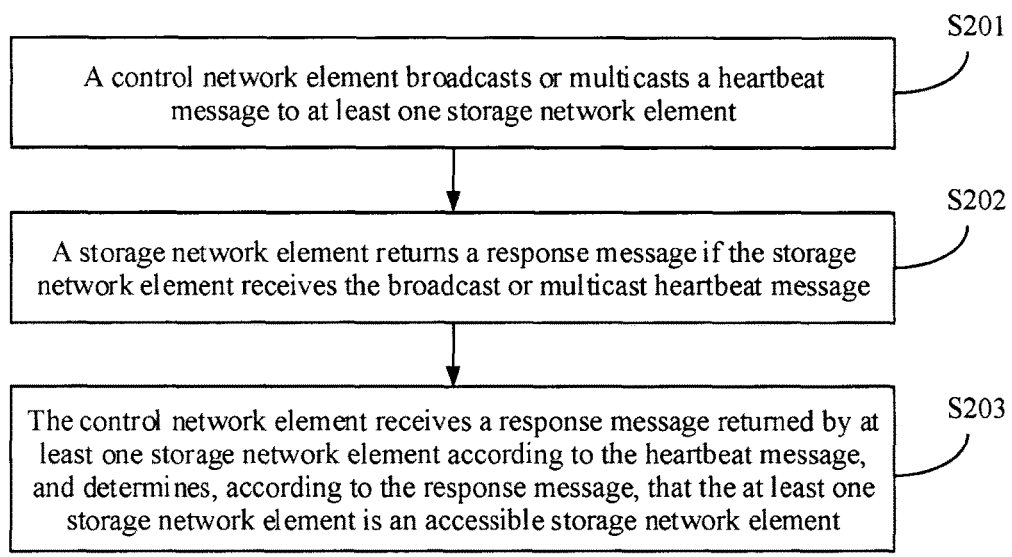
FIG. 2 is a schematic flowchart of Embodiment 1 of a storage network element discovery method according to the present disclosure.

FIG. 2 is a schematic flowchart of Embodiment 1 of a storage network element discovery method according to the present disclosure. As shown in FIG. 2, the method includes the following steps.

Step S201: A control network element broadcasts or multicasts a heartbeat message to at least one storage network element.

Before step S201, the control network element and the storage network element are powered on and initialized separately.

After initialization is completed, the control network element establishes a logical network interface, for example, an Ethernet interface in order to obtain address information of the control network element. The address information may be a Media Access Control (MAC) address.

The heartbeat message may include the address information, such as a MAC address, of the control network element. However, the heartbeat message is not limited thereto, and may further include another message such as a packet type. For example, the heartbeat message is sent using a heartbeat packet, and may carry type information of the heartbeat packet such as an "Ethernet" packet. This is not limited herein.

The control network element may choose to send the heartbeat message in a broadcast or multicast manner. This is not limited herein. If the heartbeat message is sent in a multicast manner, the heartbeat message may carry address information of multiple storage network elements or the like, that is, may be sent to multiple corresponding storage network elements.

Step S202: A storage network element returns a response message if the storage network element receives the broadcast or multicast heartbeat message.

The storage network element herein may be any storage network element in the foregoing storage array.

Step S203: The control network element receives a response message returned by at least one storage network element according to the heartbeat message, and determines, according to the response message, that the at least one storage network element is an accessible storage network element.

The response message may include network parameter information of the corresponding storage network element. The network parameter information may include network address information of the storage network element and address information of a storage medium. The address information of the storage medium may be address information of at least one storage medium in the storage network element that returns the response message. Specific content of the network parameter information is not limited herein, and may be flexibly configured according to a specific requirement and scenario. For example, if the present disclosure is extended to another type of network, the network parameter information may further include type information of the storage network element or the like, or may further include a namespace of the storage medium or the like. The namespace may be a partition in the storage medium.

After the control network element broadcasts or multicasts the heartbeat message, a storage network element receiving the heartbeat message makes a reply. These storage network elements making a reply are storage network elements that can be accessed by the control network element. In this way, the control network element may determine, according to received response messages, a quantity of storage network elements that can be accessed by the control network element and related network information of these accessible storage network elements, and further learn information such as a topology of the storage array. Subsequently, the control network element may perform an operation such as data read/write on these accessible storage network elements.

In this embodiment, a control network element broadcasts or multicasts a heartbeat message to at least one storage network element, receives a response message returned by at least one storage network element according to the heartbeat message, and further determines, according to the response message, that the at least one storage network element is an accessible storage network element. In a NOF storage array, by broadcasting or multicasting a heartbeat message and according to a reply from a storage network element, a control network element may determine a storage network element that can be accessed by the control network element, and know related information of the accessible storage network element according to network parameter information returned by the accessible storage network element.

Figure 3:
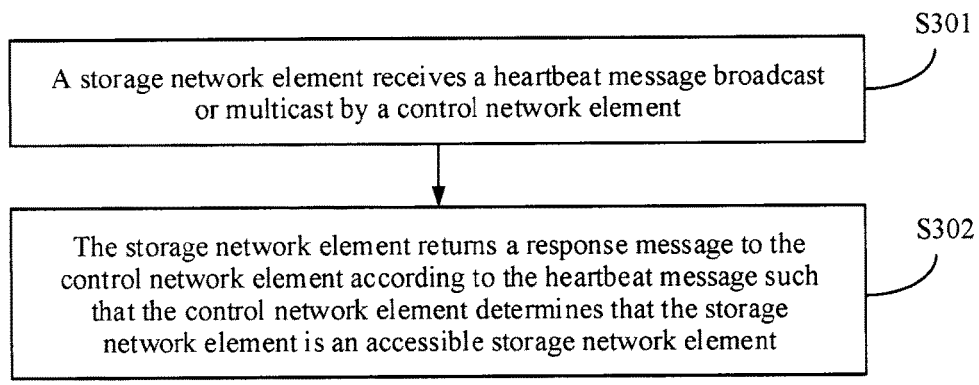
FIG. 3 is a schematic flowchart of Embodiment 2 of a storage network element discovery method according to the present disclosure.

FIG. 3 is a schematic flowchart of Embodiment 2 of a storage network element discovery method according to the present disclosure. In FIG. 3, one of the foregoing at least one storage network element is used as an example to describe the method executed by the storage network element. The storage network element may be any one of the foregoing at least one storage network element. As shown in FIG. 3, the method includes the following steps.

Step S301: The storage network element receives a heartbeat message broadcast or multicast by the control network element.

The heartbeat message includes address information of the control network element. As described in the foregoing embodiment, the address information may be a MAC address. This is not limited herein.

Step S302: The storage network element returns a response message to the control network element according to the heartbeat message such that the control network element determines that the storage network element is an accessible storage network element.

The response message may include network parameter information of the storage network element.

Further, after being powered on separately, the storage network element may collect the network parameter information of the storage network element. Specific collection may be completed by software or hardware on a storage network element side. For example, collection may be performed by an application-specific integrated circuit (ASIC). This is not limited herein.

In a NOF storage array, the storage network element and a storage medium in the storage network element are connected using an NVMe interface. In a process of collecting the network parameter information, the storage network element obtains address information of each storage medium using an NVMe interface between the storage network element and the storage medium.

Further, after the heartbeat message broadcast or multicast by the control network element is received, the network parameter information may be carried in the response message and returned to the control network element such that the control network element knows the related network parameter information of the accessible storage network element. The storage network element always maintains the network parameter information.

In this embodiment, a storage network element replies to a control network element according to a heartbeat message broadcast or multicast by the control network element such that the control network element may learn a storage network element that can be accessed by the control network element, and further learn a storage array.

Optionally, that the control network element broadcasts or multicasts a heartbeat message may be that the control network element periodically broadcasts or multicasts the heartbeat message.

Correspondingly, that the storage network element returns a response message to the control network element according to the heartbeat message may be that the storage network element periodically returns a response message to the control network element according to the heartbeat message.

That is, the control network element periodically receives a response message returned by the foregoing at least one storage network element.

A period is not limited herein, and may be flexibly set according to a specific requirement.

Further, after the control network element receives the response message returned by the at least one storage network element according to the heartbeat message, if the control network element does not receive, within a preset period of time, a response message returned by a first accessible storage network element, the control network element determines that a link to the first accessible storage network element is disconnected. The first accessible storage network element is any storage network element in the at least one storage network element.

The first accessible storage network element has always normally returned the foregoing response message to the control network element when the control network element periodically broadcasts or multicasts a heartbeat packet. However, if the control network element does not receive, in a period, a response message returned by the first accessible storage network element, the control network element considers that the link to the first accessible storage network element is disconnected. Usually, the link may be broken, a hot swap may occur, or the like. This is not limited herein.

The network parameter information may further include link status information used to indicate link status information of the storage network element. For example, a flag field is added to the network parameter information to indicate whether a link status changes.

Optionally, the link status information indicates a link status of a storage medium in the storage network element.

In another implementation manner, if network parameter information returned by a first accessible storage network element includes link status information, after the control network element receives the response message returned by the at least one storage network element according to the heartbeat message, the control network element may determine a link status of the first accessible storage network element according to the link status information. For example, if the link status information indicates that a link status changes, the control network element may learn, according to the link status information, that the link status changes. In this case, the control network element usually considers that a link or links to one or more storage media in the storage network element is or are disconnected. For example, a hot swap occurs. However, this is not limited thereto.

The storage network element monitors a link status after being powered on separately, that is, determines whether link status change information sent by an internal storage medium is received. If the link status change information is received, the storage network element updates the network parameter information maintained by the storage network element, and indicates, in the network parameter information, that the link status changes. After the heartbeat message broadcast or multicast by the control network element is received next time, a response message indicating that the link status changes is returned.

In this embodiment of the present disclosure, a control network element may discover, by broadcasting or multicasting a heartbeat packet, a storage network element that can be accessed by the control network element, further determine a storage topology of the control network element, and may further subsequently determine a link status, other fault information, or the like according to a response message returned by the storage network element.

Based on the foregoing embodiment, that the control network element determines a link status of the first accessible storage network element according to the link status information includes that the control network element determines, according to the link status information, that a link to a storage medium in the first accessible storage network element is disconnected. The control network element may further perform link repair. Optionally, after the control network element determines, according to the link status information, that the link to the storage medium in the first accessible storage network element is disconnected, the control network element sends a link repair processing request to the first accessible storage network element. After receiving the link repair processing request, the storage network element may perform link repair according to the link repair processing request.

Further, the storage network element may perform link repair according to an actual status of link disconnection, for example, perform link reconstruction or link migration. This is not limited herein.

In the foregoing embodiment, the control network element learns storage network elements that can be accessed by the control network element, and may subsequently perform an operation such as data read/write on these accessible storage network elements.

In a data read process, the control network element sends a data read request to an accessible storage network element using a switching device. The data read request includes storage-network-element address information, to-be-read-data location information, and the like. After receiving the data read request, the storage network element obtains to-be-read data according to the data read request, and returns the to-be-read data to the control network element using the switching device.

Figure 4:
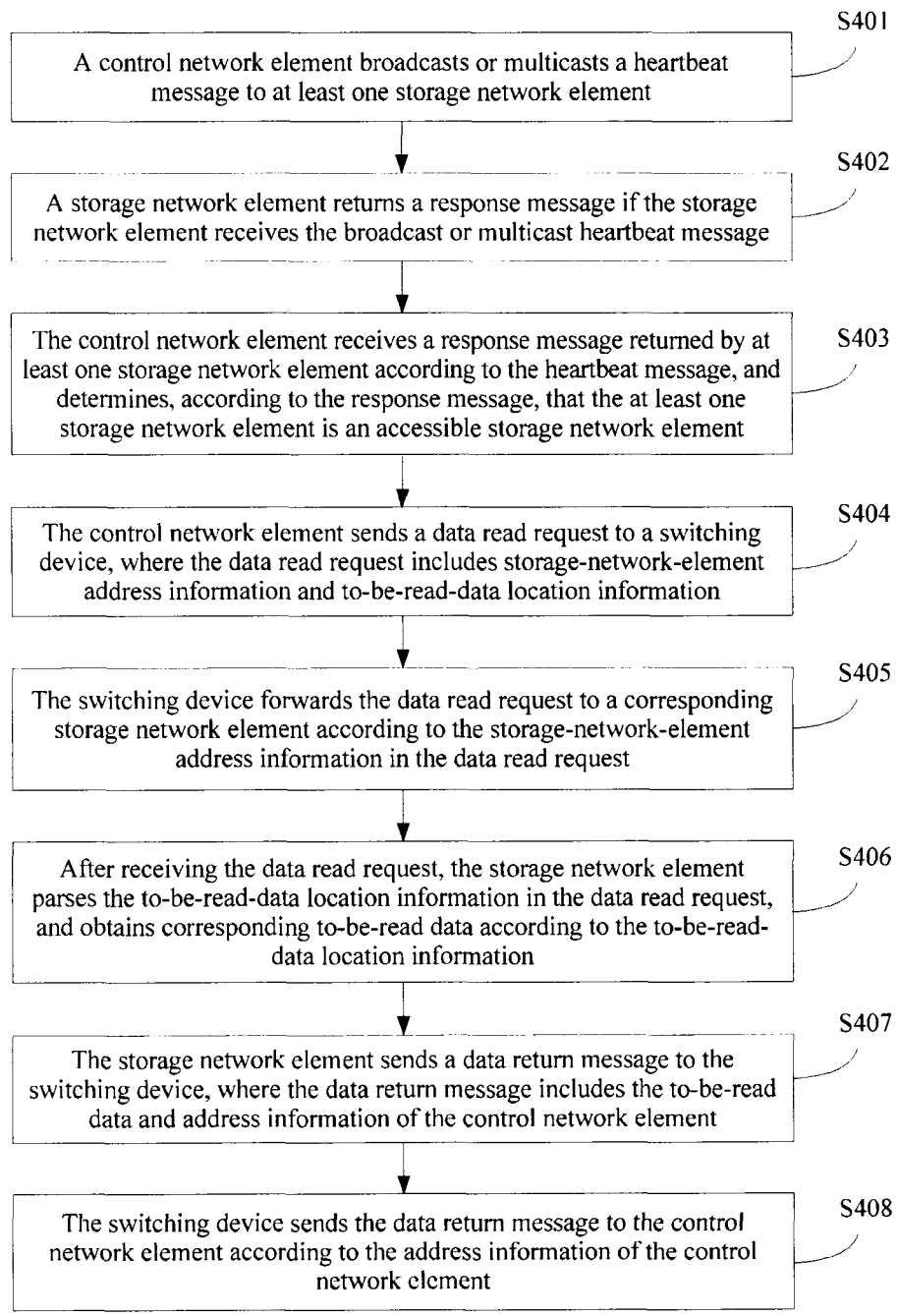
FIG. 4 is a schematic flowchart of Embodiment 3 of a storage network element discovery method according to the present disclosure.

FIG. 4 is a schematic flowchart of Embodiment 3 of a storage network element discovery method according to the present disclosure. As shown in FIG. 4, the method includes the following steps.

Step S401: A control network element broadcasts or multicasts a heartbeat message to at least one storage network element.

Step S402: A storage network element returns a response message if the storage network element receives the broadcast or multicast heartbeat message.

Step S403: The control network element receives a response message returned by at least one storage network element according to the heartbeat message, and determines, according to the response message, that the at least one storage network element is an accessible storage network element.

Step S404: The control network element sends a data read request to a switching device, where the data read request includes storage-network-element address information and to-be-read-data location information.

Further, the control network element may invoke a NOF software program of the control network element and send the data read request using a NOF logical interface.

The to-be-read-data location information may be further indicated by information such as a logical block address (LBA), a length (LEN), a namespace identifier (NSID), or a scatter gather list (SGL) carried in the data read request. The to-be-read-data location information refers to a specific location, for storing data, in a storage medium, for example, information such as a starting bit.

Step S405: The switching device forwards the data read request to a corresponding storage network element according to the storage-network-element address information in the data read request.

Step S406: After receiving the data read request, the storage network element parses the to-be-read-data location information in the data read request, and obtains corresponding to-be-read data according to the to-be-read-data location information.

That is, the storage network element determines, according to the to-be-read-data location information, specific locations for storing the data, then obtains, by invoking an NVMe interface, the data stored in these locations, and returns the data to the control network element.

Step S407: The storage network element sends a data return message to the switching device, where the data return message includes the to-be-read data and address information of the control network element.

Step S408: The switching device sends the data return message to the control network element according to the address information of the control network element.

Likewise, in a data write process, the control network element sends a data write request to the accessible storage network element using a switching device. The data write request includes to-be-written data, storage-network-element address information, and to-be-written-data location information. The storage network element receives the data write request, and writes the to-be-written data according to the data write request. After data write is completed, the storage network element returns a write success response to the control network element such that the control network element knows that the data is successfully written.

Figure 5:
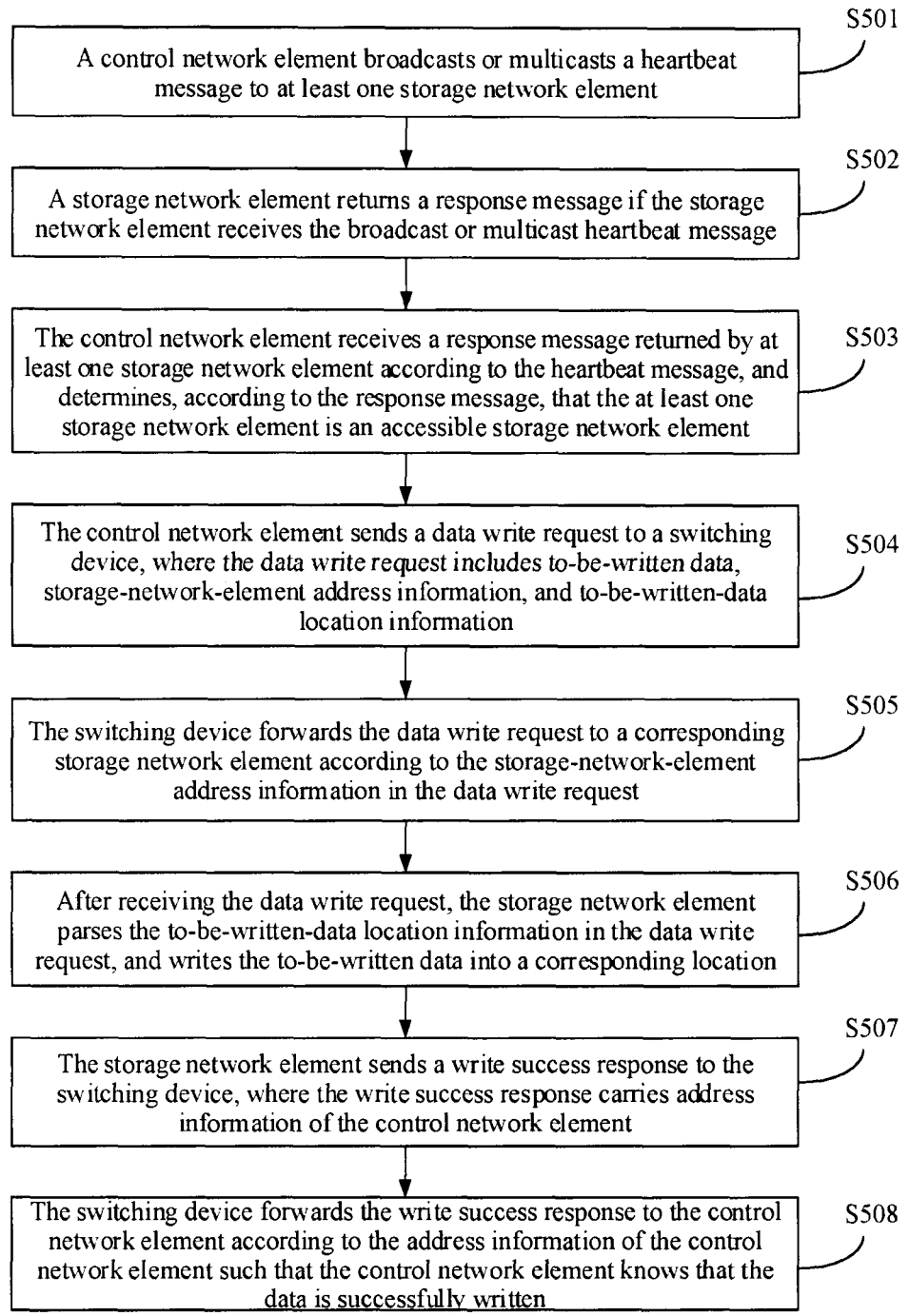
FIG. 5 is a schematic flowchart of Embodiment 4 of a storage network element discovery method according to the present disclosure.

FIG. 5 is a schematic flowchart of Embodiment 4 of a storage network element discovery method according to the present disclosure. As shown in FIG. 5, the method includes the following steps.

Step S501: A control network element broadcasts or multicasts a heartbeat message to at least one storage network element.

Step S502: A storage network element returns a response message if the storage network element receives the broadcast or multicast heartbeat message.

Step S503; The control network element receives a response message returned by at least one storage network element according to the heartbeat message, and determines, according to the response message, that the at least one storage network element is an accessible storage network element.

Step S504: The control network element sends a data write request to a switching device, where the data write request includes to-be-written data, storage-network-element address information, and to-be-written-data location information.

Further, the control network element may invoke a NOF software program of the control network element and send the data write request using a NOF logical interface.

The to-be-written-data location information may be indicated using information such as an LBA, an LEN, an NSID, or an SGL. The to-be-written-data location information further refers to a specific location, for storing data, in a storage medium, for example, information such as a starting bit.

Step S505: The switching device forwards the data write request to a corresponding storage network element according to the storage-network-element address information in the data write request.

Step S506: After receiving the data write request, the storage network element parses the to-be-written-data location information in the data write request, and writes the to-be-written data into a corresponding location.

The storage network element only needs to determine the corresponding location according to the to-be-written-data location information, and write the to-be-written data.

Step S507: The storage network element sends a write success response to the switching device, where the write success response carries address information of the control network element.

Step S508: The switching device forwards the write success response to the control network element according to the address information of the control network element such that the control network element knows that the data is successfully written.

Further, both the heartbeat message and the response message may use a packet structure shown in Table 1. However, this is not limited thereto. As shown in Table 1:

TABLE 1

| Index | Field | | | | |
|---|---|---|---|---|---|
| | 63:56 | 55:48 | 47:32 | 31:8 | 7:0 |
| q-0 | Source address | | Destination address | | |
| q-1 | Control information tag | | 802.1 Q tag | Source address type | |
| q-2 | Reserved bits | | Physical link Tag ID | | Packet type |
| q-3 | Address of a storage medium | | | | |
| q-4 | Payload | | | | |
| ... | | | | | |
| q-n | | | | | |

In a case of the heartbeat message, in Table 1, the source address in line "q-0" is an address of the control network element, and the destination address is an address of the storage network element. In a case of the response message, the source address in line "q-0" is an address of the storage network element, and the destination address is an address of the control network element. The source address in line "q-1" may be the same as the source address in line "q-0".

The "Packet type" field in "q-2" may be used to distinguish between the heartbeat message and the response message. The control network element discards the packet when the "packet type" indicates that the packet is the heartbeat message, if the control network element receives the packet, and determines that the packet is the heartbeat message. If the storage network element receives the heartbeat message, the storage network element makes a response, that is, returns the foregoing response message.

When the "Packet type" indicates that the packet is the response message, if the control network element receives the packet, and determines that the packet is the response message, the control network element parses the packet, and obtains the network parameter information added to the response message by the storage network element.

The "Physical link ID" is an identity of a physical link between a control network element and a storage network element.

Content of the "Payload" field in "q-4" to "q-n" of the heartbeat message is different from that of the response message. Table 2 shows a "Payload" field of a heartbeat packet. However, this is not limited thereto.

TABLE 2

| | | Byte 1 | | | | | | | Byte 0 | | | | | | |
|---|---|---|---|---|---|---|---|---|---|---|---|---|---|---|---|
| Byte 3 | Byte 2 | 15 | 14 | 13 | 12 | 11 | 10 | 9 | 8 | 7 | 6 | 5 | 4 | 3 | 2 | 1 | 0 |
| 0 | Reserved | Reserved | | | | | | | Packet type | | | | | | |
| 1 | | | | | | | Reserved | | | | | | | | |
| 2 | | | | | | | Reserved | | | | | | | | |
| 3 | | | | | | | Reserved | | | | | | | | |

TABLE 2-continued

| | | Byte 1 | | | | | | | | Byte 0 | | | | | | |
|---|---|---|---|---|---|---|---|---|---|---|---|---|---|---|---|---|
| Byte 3 | Byte 2 | 15 | 14 | 13 | 12 | 11 | 10 | 9 | 8 | 7 | 6 | 5 | 4 | 3 | 2 | 1 | 0 |
| 4 | | | | | | | Reserved | | | | | | | | | |
| ... | | | | | | | Reserved | | | | | | | | | |
| 15 | | | | | | | Reserved | | | | | | | | | |

Each byte includes eight bits.

Table 3 in FIG. 16 shows a "Payload" field of a heartbeat packet. However, this is not limited thereto.

The "Address family" in Table 3 may indicate a transmission type. The transmission address in lines 5 to 8 is an address matching the transmission type. For example, the transmission type is Internet Protocol (IP) version 4 (IPv4), and the transmission address is an IPv4 address. This is not limited herein.

A value of "V" in "V=1" in Table 3 indicates packet validity. A value of "BC" in "BC=2" indicates a broadcast type. Certainly, if a multicast manner is used, the field may be used to fill a multicast type. This is not limited herein. A value of "OPC" in "OPC=0x060" indicates a value of operate code. A value of "HTAG" in "HTAG=0" is a command tag of the control network element. The value of "HTAG" is used to distinguish each command.

Figure 6:
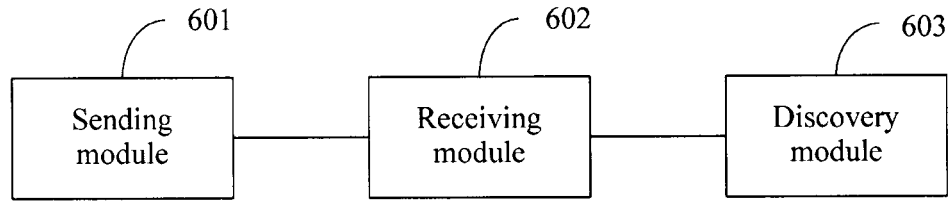
FIG. 6 is a schematic structural diagram of Embodiment 1 of a control network element according to the present disclosure.

FIG. 6 is a schematic structural diagram of Embodiment 1 of a control network element according to the present disclosure. The control network element is the control network element in the foregoing embodiments, and is applied to a storage array. As shown in FIG. 6, the control network element may include a sending module 601, a receiving module 602, and a discovery module 603.

The sending module 601 is configured to broadcast or multicast a heartbeat message to at least one storage network element. The heartbeat message includes address information of the control network element.

The receiving module 602 is configured to receive a response message returned by at least one storage network element according to the heartbeat message.

The discovery module 603 is configured to determine, according to the response message, that the at least one storage network element is an accessible storage network element. The response message includes network parameter information of the corresponding storage network element.

The network parameter information includes network address information of the storage network element and address information of the storage medium. The address information of the storage medium is obtained by the storage network element using an NVMe interface between the storage network element and the storage medium.

Optionally, the sending module 601 periodically broadcasts or multicasts the heartbeat message to the at least one storage network element.

Correspondingly, the receiving module 602 periodically receives a response message returned by the at least one storage network element.

Figure 7:
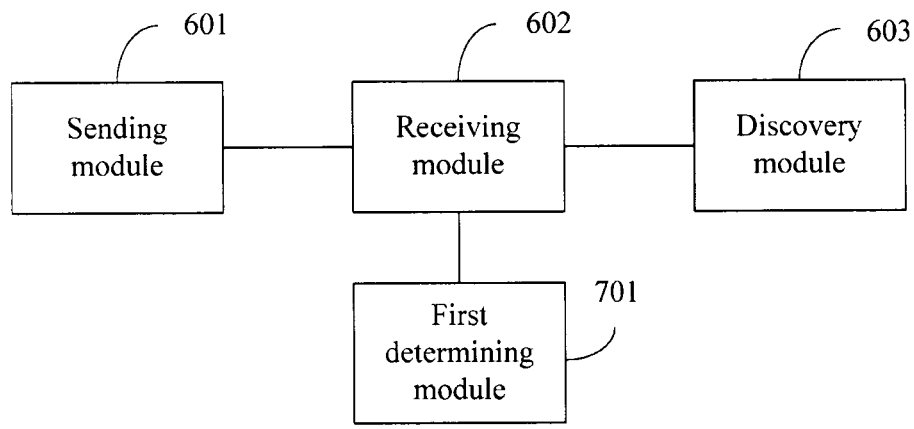
FIG. 7 is a schematic structural diagram of Embodiment 2 of a control network element according to the present disclosure.

FIG. 7 is a schematic structural diagram of Embodiment 2 of a control network element according to the present disclosure. As shown in FIG. 7, based on FIG. 6, the control network element may further include a first determining module 701 configured to determine that a link to the first accessible storage network element is disconnected when the receiving module 602 does not receive, within a preset period of time, a response message returned by a first accessible storage network element.

The first accessible storage network element is any storage network element in the at least one storage network element.

Optionally, the network parameter information returned by the first accessible storage network element may further include link status information.

Figure 8:
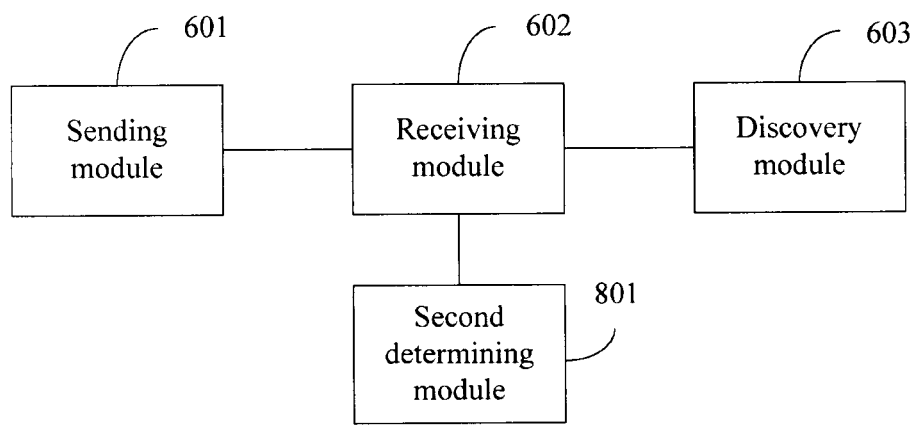
FIG. 8 is a schematic structural diagram of Embodiment 3 of a control network element according to the present disclosure.

FIG. 8 is a schematic structural diagram of Embodiment 3 of a control network element according to the present disclosure. As shown in FIG. 8, based on FIG. 6, the control network element may further include a second determining module 801 configured to determine a link status of the first accessible storage network element according to the link status information.

The first accessible storage network element is any storage network element in the at least one storage network element.

Figure 9:
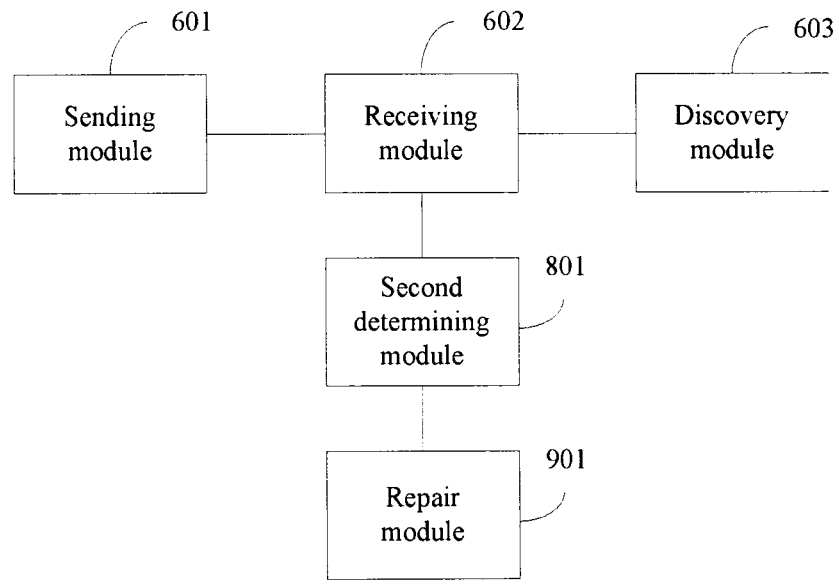
FIG. 9 is a schematic structural diagram of Embodiment 4 of a control network element according to the present disclosure.

FIG. 9 is a schematic structural diagram of Embodiment 4 of a control network element according to the present disclosure. As shown in FIG. 9, based on FIG. 8, the control network element may further include a repair module 901.

Further, the second determining module 801 may determine, according to the link status information, that a link to a storage medium in the first accessible storage network element is disconnected.

The repair module 901 is configured to send a link repair processing request to the first accessible storage network element.

Further, the link repair processing request may be sent by a sending apparatus such as a transmitter in a memory.

Optionally, in an implementation manner, after it is determined, according to the response message, that the at least one storage network element is an accessible storage network element, the sending module 601 may further send a data read request to the accessible storage network element using a switching device. The data read request includes storage-network-element address information and to-be-read-data location information.

The receiving module 602 may further receive to-be-read data returned by the accessible storage network element according to the data read request.

Optionally, in another implementation manner, the sending module 601 may be further configured to send a data write request to the accessible storage network element using a switching device. The data write request includes to-be-written data, storage-network-element address information, and to-be-written-data location information.

The receiving module 602 may further receive a write success response returned by the accessible storage network element according to the data write request.

For an implementation principle and a technical effect of the control network element, refer to the foregoing method embodiments. Details are not described herein again.

Figure 10:
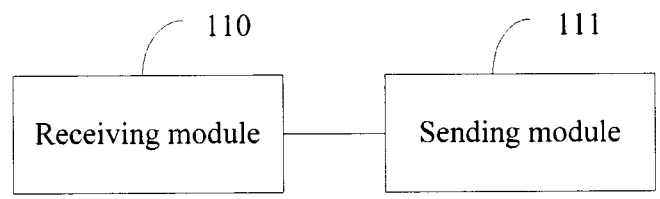
FIG. 10 is a schematic structural diagram of Embodiment 1 of a storage network element according to the present disclosure.

FIG. 10 is a schematic structural diagram of Embodiment 1 of a storage network element according to the present disclosure. The storage network element is the storage network element in the foregoing embodiments, and may be any storage network element in a storage array. As shown in FIG. 10, the storage network element includes a receiving module 110 and a sending module 111.

The receiving module 110 is configured to receive a heartbeat message broadcast or multicast by the control network element. The heartbeat message includes address information of the control network element.

The sending module 111 is configured to return a response message to the control network element according to the heartbeat message such that the control network element determines that the storage network element is an accessible storage network element. The response message includes network parameter information of the storage network element.

The network parameter information includes a network address of the storage network element, and address information of the storage medium in the storage network element that is obtained by the storage network element using an NVMe interface.

Optionally, the receiving module 110 is further configured to receive the heartbeat message periodically broadcast or multicast by the control network element.

Correspondingly, the sending module 111 is further configured to periodically return a response message to the control network element according to the heartbeat message.

Optionally, the sending module 111 is further configured to return, to the control network element according to the heartbeat message, a response message that carries link status information such that the control network element determines a link status of the storage network element according to the link status information.

Figure 11:
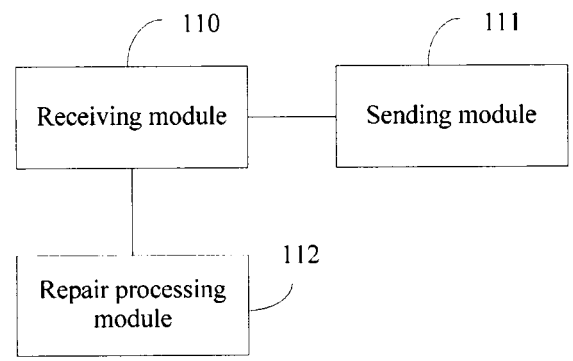
FIG. 11 is a schematic structural diagram of Embodiment 2 of a storage network element according to the present disclosure.

FIG. 11 is a schematic structural diagram of Embodiment 2 of a storage network element according to the present disclosure. Based on FIG. 10, the storage network element may further include a repair processing module 112.

Further, the receiving module 110 may receive a link repair processing request sent by the control network element.

The repair processing module 112 performs link repair according to the link repair processing request.

Figure 12:
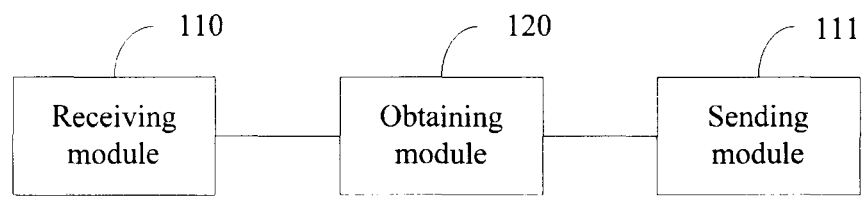
FIG. 12 is a schematic structural diagram of Embodiment 3 of a storage network element according to the present disclosure.

FIG. 12 is a schematic structural diagram of Embodiment 3 of a storage network element according to the present disclosure. Based on FIG. 10, the storage network element may further include an obtaining module 120.

The receiving module 110 is further configured to receive a data read request sent by the control network element using a switching device. The data read request includes storage-network-element address information and to-be-read-data location information.

The obtaining module 120 is configured to obtain to-be-read data according to the data read request.

The sending module 111 is further configured to return the to-be-read data to the control network element using the switching device.

Figure 13:
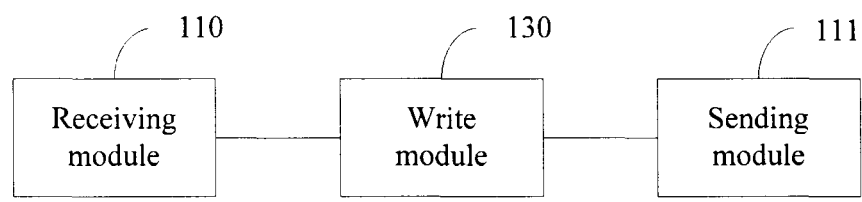
FIG. 13 is a schematic structural diagram of Embodiment 4 of a storage network element according to the present disclosure.

FIG. 13 is a schematic structural diagram of Embodiment 4 of a storage network element according to the present disclosure. Based on FIG. 10, the storage network element may further include a write module 130.

The receiving module 110 is configured to receive a data write request that is sent by the control network element using a switching device. The data write request includes to-be-written data, storage-network-element address information, and to-be-written-data location information.

The write module 130 is configured to write the to-be-written data according to the data write request.

The sending module 111 is configured to return a write success response to the control network element.

For an implementation principle and a technical effect of the storage network element, refer to the foregoing method embodiments. Details are not described herein again.

Figure 14:
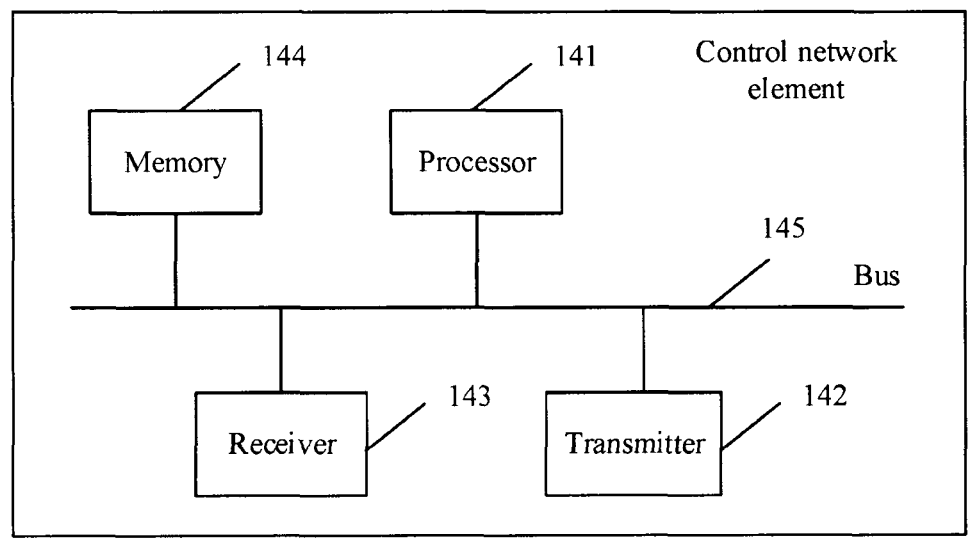
FIG. 14 is a schematic structural diagram of Embodiment 5 of a control network element according to the present disclosure.

FIG. 14 is a schematic structural diagram of Embodiment 5 of a control network element according to the present disclosure. As shown in FIG. 14, the control network element includes a processor 141, a transmitter 142, a receiver 143, and a memory 144. The processor 141, the transmitter 142, the receiver 143, and the memory 144 are connected using a bus 145.

In actual application, the processor 141, the transmitter 142, the receiver 143, and the memory 144 may not be in a bus structure, and may be in another structure, for example, a star structure. This is not limited in this embodiment of the present disclosure.

The memory 144 is configured to store an instruction. The processor 141 is configured to invoke the instruction in the memory 144 to execute the following method.

The processor 141 broadcasts or multicasts a heartbeat message to at least one storage network element using the transmitter 142. The heartbeat message includes address information of the control network element.

The processor 141 receives, using the receiver 143, a response message returned by at least one storage network element according to the heartbeat message, and determines, according to the response message, that the at least one storage network element is an accessible storage network element. The response message includes network parameter information of the corresponding storage network element.

The network parameter information includes network address information of the storage network element and address information of the storage medium. The address information of the storage medium is obtained by the storage network element using an NVMe interface between the storage network element and the storage medium.

In this embodiment, a control network element broadcasts or multicasts a heartbeat message to at least one storage network element, receives a response message returned by at least one storage network element according to the heartbeat message, and further determines, according to the response message, that the at least one storage network element is an accessible storage network element. In a NOF storage array, by broadcasting or multicasting a heartbeat message and according to a reply from a storage network element, a control network element may determine a storage network element that can be accessed by the control network element, and know related information of the accessible storage network element according to network parameter information returned by the accessible storage network element.

Optionally, the processor 141 is further configured to periodically broadcast or multicast the heartbeat message to the at least one storage network element using the transmitter 142, and periodically receive, using the receiver 143, a response message returned by the at least one storage network element.

Optionally, if the processor 141 does not receive, within a preset period of time, a response message returned by a first accessible storage network element, the processor 141 determines that a link to the first accessible storage network element is disconnected. The first accessible storage network element is any storage network element in the at least one storage network element.

Optionally, if the network parameter information returned by a first accessible storage network element includes link status information, after receiving, using the receiver 143, the response message returned by the at least one storage network element according to the heartbeat message, the processor 141 determines a link status of the first accessible storage network element according to the link status information.

The first accessible storage network element is any storage network element in the at least one storage network element.

The processor 141 is further configured to determine, according to the link status information, that a link to a storage medium in the first accessible storage network element is disconnected.

Correspondingly, after determining that the link to the storage medium in the first accessible storage network element is disconnected, the processor 141 sends a link repair processing request to the first accessible storage network element using the transmitter.

Optionally, after the processor 141 determines, according to the response message, that the at least one storage network element is an accessible storage network element, the processor 141 uses the transmitter 142, and the transmitter 142 sends a data read request to the accessible storage network element using a switching device. The data read request includes storage-network-element address information and to-be-read-data location information. The processor 141 receives, using the receiver 143, to-be-read data returned by the accessible storage network element according to the data read request.

Optionally, after the processor 141 determines, according to the response message, that the at least one storage network element is an accessible storage network element, the processor 141 uses the transmitter 142, and the transmitter 142 sends a data write request to the accessible storage network element using a switching device. The data write request includes to-be-written data, storage-network-element address information, and to-be-written-data location information. The receiver 143 receives a write success response returned by the accessible storage network element according to the data write request.

Figure 15:
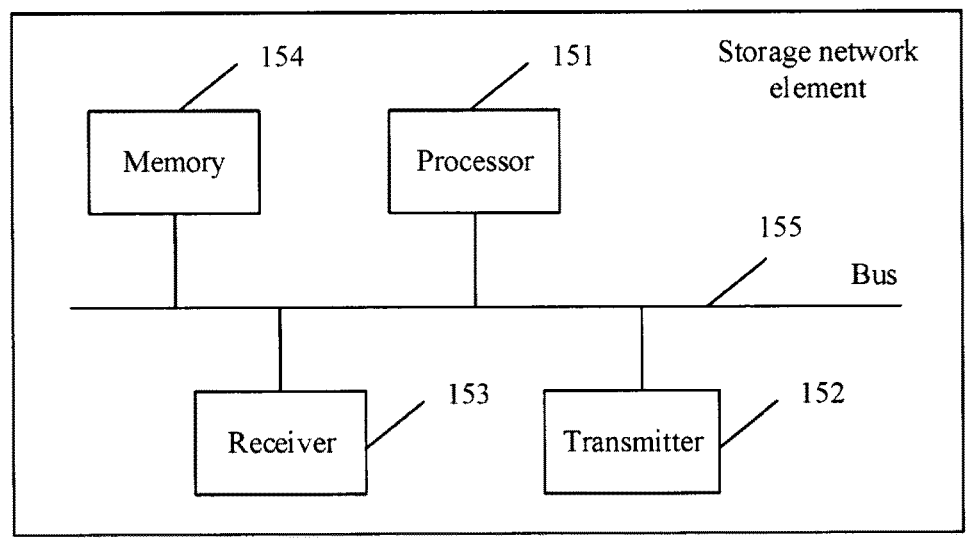
FIG. 15 is a schematic structural diagram of Embodiment 5 of a storage network element according to the present disclosure.

FIG. 15 is a schematic structural diagram of Embodiment 5 of a storage network element according to the present disclosure. As shown in FIG. 15, the storage network element includes a processor 151, a transmitter 152, a receiver 153, and a memory 154. The processor 151, the transmitter 152, the receiver 153, and the memory 154 are connected using a bus 155.

In actual application, the processor 151, the transmitter 152, the receiver 153, and the memory 154 may not be in a bus structure, and may be in another structure, for example, a star structure. This is not limited in this embodiment of the present disclosure.

The memory 154 is configured to store an instruction. The processor 151 is configured to invoke the instruction in the memory 154 to execute the following method.

The processor 151 receives, using the receiver 153, a heartbeat message broadcast or multicast by the control network element. The heartbeat message includes address information of the control network element. The processor 151 returns a response message to the control network element using the transmitter 152 such that the control network element determines that the storage network element is an accessible storage network element. The response message includes network parameter information of the storage network element.

The network parameter information includes a network address of the storage network element, and address information of the storage medium in the storage network element that is obtained by the storage network element using an NVMe interface.

Optionally, the processor 151 receives, using the receiver 153, the heartbeat message periodically broadcast or multicast by the control network element, and periodically returns a response message to the control network element according to the heartbeat message using the transmitter 152.

That the processor 151 returns a response message to the control network element according to the heartbeat message using the transmitter includes that the processor 151 returns, to the control network element according to the heartbeat message using the transmitter 152, a response message that carries link status information such that the control network element determines a link status of the storage network element according to the link status information.

Further, if the link status information indicates that a link to a storage medium in the storage network element is disconnected, the processor 151 receives, using the receiver 153, a link repair processing request sent by the control network element, and performs link repair according to the link repair processing request.

Optionally, the processor 151 receives, using the receiver 153, a data read request sent by the control network element using a switching device. The data read request includes storage-network-element address information and to-be-read-data location information. Further, the processor 151 obtains to-be-read data according to the data read request. The processor 151 uses the transmitter 152, and the transmitter 152 returns the to-be-read data to the control network element using the switching device.

Optionally, the processor 151 receives, using the receiver 153, a data write request sent by the control network element using a switching device. The data write request includes to-be-written data, storage-network-element address information, and to-be-written-data location information. Further, the processor 151 writes the to-be-written data according to the data write request, and the transmitter 152 returns a write success response to the control network element using the switching device.

Persons of ordinary skill in the art may understand that all or some of the steps of the method embodiments may be implemented by instructing related hardware by a program. The program may be stored in a computer readable storage medium. The steps of the method embodiments are performed when the program runs. The foregoing storage medium includes any medium that can store program code, such as a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A storage network element discovery method, applied to a control network element, wherein the control network element is in communication with at least one storage network element, wherein each storage network element comprises at least one storage medium, wherein the at least one storage network element is coupled to the at least one storage medium using a Nonvolatile Memory express (NVMe) interface, and wherein the storage network element discovery method comprises:

broadcasting or multicasting, by the control network element, a heartbeat message to the at least one storage network element, wherein the heartbeat message comprises address information of the control network element;

receiving, by the control network element, a response message returned by the at least one storage network element according to the heartbeat message;

determining, according to the response message, that the at least one storage network element is an accessible storage network element, wherein the response message comprises network parameter information of the corresponding storage network element, wherein the network parameter information comprises network address information of the corresponding storage network element and address information of the at least one storage medium, wherein the address information of the at least one storage medium is obtained by the corresponding storage network element using the NVMe interface between the corresponding storage network element and the at least one storage medium, and wherein the network parameter information returned by the accessible storage network element comprises link status information;

determining, by the control network element, a link status of the accessible storage network element according to the link status information after receiving the response message returned by the at least one storage network element, wherein the link status of the accessible storage network element is determined by determining, by the control network element according to the link status information, that a link to the accessible storage network element is decoupled; and sending, by the control network element, a link repair processing request to the accessible storage network element after determining that the link to the storage medium in the storage network element is decoupled.

2. The storage network element discovery method of claim 1, wherein after receiving the response message returned by the at least one storage network element according to the heartbeat message, the method further comprises determining, by the control network element, that a link to a first accessible storage network element is decoupled when the control network element does not receive, within a preset period of time, a response message returned by the first accessible storage network element, wherein the first accessible storage network element is any storage network element in the at least one storage network element.

3. The storage network element discovery method of claim 1, wherein after determining that the at least one storage network element is the accessible storage network element, the storage network element discovery method further comprises:

sending, by the control network element, a data read request to the accessible storage network element using a switching device, wherein the data read request comprises storage-network-element address information and to-be-read-data location information; and receiving, by the control network element, to-be-read data returned by the accessible storage network element according to the data read request.

4. The storage network element discovery method of claim 1, wherein after determining that the at least one storage network element is the accessible storage network element, the storage network element discovery method further comprises:

sending, by the control network element, a data write request to the accessible storage network element using a switching device, wherein the data write request comprises to-be-written data, storage-network-element address information, and to-be-written-data location information; and receiving, by the control network element, a write success response returned by the accessible storage network element according to the data write request.

5. A storage network element discovery method, applied to a storage network element, wherein the storage network element is in communication with at least one control network element, wherein the storage network element comprises at least one storage medium, wherein the storage network element is coupled to the at least one storage medium using a Nonvolatile Memory Express (NVMe) interface, and wherein the storage network element discovery method comprises:

receiving, by the storage network element, a heartbeat message broadcast or multicast by the at least one control network element, wherein the heartbeat message comprises address information of the at least one control network element;

returning, by the storage network element, a response message to the at least one control network element according to the heartbeat message such that the at least one control network element determines that the storage network element is an accessible storage network element, wherein the response message comprises network parameter information of the storage network element, wherein the network parameter information comprises a network address of the storage network element and address information of the at least one storage medium in the storage network element obtained by the storage network element using the NVMe interface, wherein the response message is returned to the at least one control network element by returning, by the storage element to the at least one control network element according to the heartbeat message, a response message that carries link status information such that the at least one control network element determines a link status of the storage network element according to the link status information, and wherein the link status information indicates that a link to a storage medium in the storage network element is decoupled;

receiving, by the storage network element, a link repair processing request from the at least one control network element after returning the response message to the at least one control network element according to the heartbeat message; and performing, by the storage network element, link repair according to the link repair processing request.

6. The storage network element discovery method of claim 5, wherein after returning the response message, the storage network element discovery method further comprises:

receiving, by the storage network element, a data read request from the at least one control network element using a switching device, wherein the data read request comprises storage-network-element address information and to-be-read-data location information;

obtaining, by the storage network element, to-be-read data according to the data read request; and returning, by the storage network element, the to-be-read data to the at least one control network element using the switching device.

7. The storage network element discovery method of claim 5, wherein after returning the response message, the storage network element discovery method further comprises:
receiving, by the storage network element, a data write request from the at least one control network element using a switching device, wherein the data write request comprises to-be-written data, storage-network-element address information, and to-be-written-data location information;
writing, by the storage network element, the to-be-written data according to the data write request; and
returning a write success response to the at least one control network element.

8. A control network element, wherein the control network element is in communication with at least one storage network element, wherein each storage network element comprises at least one storage medium, wherein the at least one storage network element is coupled to the at least one storage medium using a Nonvolatile Memory Express (NVMe) interface, and wherein the control network element comprises:
a memory comprising instructions; and
a processor coupled to the memory, wherein the instructions cause the processor to be configured to:
broadcast or multicast a heartbeat message to the at least one storage network element, wherein the heartbeat message comprises address information of the control network element;
receive a response message returned by the at least one storage network element according to the heartbeat message;
determine, according to the response message, that the at least one storage network element is an accessible storage network element, wherein the response message comprises network parameter information of the corresponding storage network element, wherein the network parameter information comprises network address information of the corresponding storage network element and address information of the at least one storage medium, wherein the address information of the at least one storage medium is obtained by the corresponding storage network element using the NVMe interface between the corresponding storage network element and the at least one storage medium, and wherein the network parameter information returned by the accessible storage network element comprises link status information;
determine a link status of the accessible storage network element according to the link status information, wherein the accessible storage network element is any storage network element in the at least one storage network element;
determine, according to the link status information, that a link to a storage medium in the accessible storage network element is decoupled; and
send a link repair processing request to the accessible storage network element.

9. The control network element of claim 8, wherein the instructions further cause the processor to be configured to determine that a link to a first accessible storage network element is decoupled when the control network element does not receive, within a preset period of time, a response message returned by the first accessible storage network element, and wherein the first accessible storage network element is any storage network element in the at least one storage network element.

10. The control network element of claim 8, wherein the instructions further cause the processor to be configured to:
send a data read request to the accessible storage network element using a switching device, wherein the data read request comprises storage-network-element address information and to-be-read-data location information; and
receive to-be-read data returned by the accessible storage network element according to the data read request.

11. The control network element of claim 8, wherein the instructions further cause the processor to be configured to:
send a data write request to the accessible storage network element using a switching device, wherein the data write request comprises to-be-written data, storage-network-element address information, and to-be-written-data location information; and
receive a write success response returned by the accessible storage network element according to the data write request.

12. A storage network element, wherein the storage network element is in communication with at least one control network element, wherein the storage network element comprises at least one storage medium, wherein the storage network element is coupled to the at least one storage medium using a Nonvolatile Memory Express (NVMe) interface, and wherein the storage network element comprises:
a memory comprising instructions; and
a processor coupled to the memory, wherein the instructions cause the processor to be configured to:
receive a heartbeat message broadcast or multicast by the at least one control network element, wherein the heartbeat message comprises address information of the at least one control network element;
return a response message to the at least one control network element according to the heartbeat message such that the at least one control network element determines that the storage network element is an accessible storage network element, wherein the response message comprises network parameter information of the storage network element, and wherein the network parameter information comprises a network address of the storage network element, and address information of the at least one storage medium in the storage network element obtained by the storage network element using the NVMe interface;
return, to the at least one control network element according to the heartbeat message, a response message that carries link status information such that the at least one control network element determines a link status of the storage network element according to the link status information;
receive a link repair processing request from the at least one control network element; and
perform link repair according to the link repair processing request.

13. The storage network element of claim 12, wherein the instructions further cause the processor to be configured to:
receive a data read request from the at least one control network element using a switching device, wherein the data read request comprises storage-network-element address information and to-be-read-data location information;

obtain to-be-read data according to the data read request; and return the to-be-read data to the at least one control network element using the switching device.

14. The storage network element of claim 12, wherein the instructions further cause the processor to be configured to:

receive a data write request from the at least one control network element using a switching device, wherein the data write request comprises to-be-written data, storage-network-element address information, and to-be-written-data location information;

write the to-be-written data according to the data write request; and return a write success response to the at least one control network element.

* * * * *